United States Patent [19]

Ostlinning et al.

[11] Patent Number: 5,118,786

[45] Date of Patent: Jun. 2, 1992

[54] PROCESS FOR THE PREPARATION OF HIGH MOLECULAR WEIGHT, OPTIONALLY BRANCHED POLYARYLENE SULPHIDES

[75] Inventors: Edgar Ostlinning, Duesseldorf; Karsten Idel; Ludwig Bottenbruch, both of Krefeld, all of Fed. Rep. of Germany

[73] Assignee: Bayer Aktiengesellschaft, Leverkusen, Fed. Rep. of Germany

[21] Appl. No.: 653,990

[22] Filed: Feb. 11, 1991

Related U.S. Application Data

[63] Continuation of Ser. No. 287,687, Dec. 20, 1988, abandoned, which is a continuation of Ser. No. 74,250, Jul. 16, 1987, abandoned, which is a continuation of Ser. No. 891,575, Aug. 1, 1986, abandoned.

[30] Foreign Application Priority Data

Aug. 13, 1985 [DE] Fed. Rep. of Germany ....... 3528978

[51] Int. Cl.⁵ .................. C08G 75/14; C08G 75/16
[52] U.S. Cl. .................................. 528/388; 525/537
[58] Field of Search ........................................ 528/388

[56] References Cited

U.S. PATENT DOCUMENTS

| | | | |
|---|---|---|---|
| 3,763,124 | 10/1973 | Edmonds, Jr. | 528/388 |
| 3,869,433 | 3/1975 | Campbell | 528/388 |
| 3,919,177 | 11/1975 | Campbell | 528/388 |
| 4,025,496 | 5/1977 | Anderson et al. | 528/388 |
| 4,056,515 | 11/1977 | Vidaurri, Jr. | |
| 4,060,520 | 11/1977 | Irvin | |
| 4,370,470 | 1/1983 | Vidaurri et al. | 528/388 |
| 4,424,339 | 1/1984 | Idel et al. | 528/388 |
| 4,500,702 | 2/1985 | Ostlinning et al. | 528/388 |
| 4,537,953 | 8/1985 | Kawatiam et al. | 528/388 |
| 4,595,748 | 6/1986 | Ostlinning et al. | 528/388 |
| 4,598,144 | 7/1986 | Ostlinning et al. | 528/388 |
| 4,605,733 | 8/1986 | Senatore | 528/388 |
| 4,663,430 | 5/1987 | Ostlinning et al. | 528/388 |
| 4,665,156 | 5/1987 | Reinking et al. | 528/388 |
| 4,760,128 | 7/1988 | Ebert et al. | 528/388 |
| 4,767,841 | 8/1988 | Goetz et al. | 528/388 |
| 4,771,120 | 9/1988 | Alewelt et al. | 528/388 |
| 4,786,711 | 11/1988 | Senatore et al. | 528/388 |
| 4,837,301 | 6/1989 | Glock et al. | 528/388 |

FOREIGN PATENT DOCUMENTS

| | | | |
|---|---|---|---|
| 0100536 | 2/1984 | European Pat. Off. | |
| 3318401 | 11/1984 | Fed. Rep. of Germany | 528/388 |

Primary Examiner—John C. Bleutge
Assistant Examiner—Helen F. Lee
Attorney, Agent, or Firm—Connolly and Hutz

[57] ABSTRACT

The invention relates to an anhydrous process for the preparation of high molecular weight, optionally branched polyarylene sulphides. These can be prepared in a polar organic solvent in the absence of water by reaction of dihalogenoaromatics with sodium sulphides and bisulphide or potassium sulphides and bisulphide in the presence of catalysts in a polar organic solvent.

8 Claims, No Drawings

PROCESS FOR THE PREPARATION OF HIGH MOLECULAR WEIGHT, OPTIONALLY BRANCHED POLYARYLENE SULPHIDES

This is a continuation of application Ser. No. 287,687 filed Dec. 20, 1988, abandoned, which in turn is a continuation of application Ser. No. 074,250 filed Jul. 16, 1987, abandoned, which in turn is a continuation of application Ser. No. 891,575 filed Aug. 1, 1986, abandoned.

The invention relates to an anhydrous process for the preparation of high molecular weight, optionally branched polyarylene sulphides. These can be prepared continuously in a polar organic solvent in the absence of water in one reaction kettle or in a cascade of reaction kettles with two to six reaction kettles and/or one or When a cascade of reaction kettles is used, the reaction mixture is metered from one kettle to the next in the cascade and the reaction temperature increases from kettle to kettle, each differing by from 5° to 30° C.

Polyarylene sulphides and their preparation are known (for example U.S. Pat. No. 2,513,188). Continuous processes for their preparation are also described (U.S. Pat. No. 4,056,515).

The known processes use water-containing starting substances which must be at least partly dehydrated in an extra reaction step before the reaction.

Thus, for example, alkali metal sulphides which have a water content of 1 to 2.4 moles of water per mole of alkali metal sulphide are used in the process of DE-OS (German Published Specification) 3,030,488. According to U.S. Pat. Nos. 4,056,515 and 4,060,520, a water content of at least 1 mole per mole of S donor remains in the reaction mixtures after the preliminary dehydration. In U.S. Pat. No. 4,282,347, water is added to the reaction mixture after the dehydration step in order to establish a certain water content.

A process in which water-containing substances are dehydrated before the reaction in the presence of all the reaction partners is also known (see DE-OS (German Published Specification) 3,243,189).

A process in which water-containing substances are freed from water before the reaction with the aid of an inert solvent which forms an azeotrope with water is also known (see DE-OS (German Published Specification) 3,318,401).

Because of the expensive dehydration, all of these processes can be carried out continuously only with great difficulty. In addition, certain amounts of water must be subsequently established in some processes. A further disadvantage is that increased pressures are to be applied in almost all the processes.

Processes which use anhydrous sodium sulphide as the source of sulphur are also known.

In contrast, an anhydrous process has now been found, by which high molecular weight, optionally branched polyarylene sulphides can be prepared and which is carried out under a slight increased pressure or under normal pressure, so that it can be carried out without a pressure apparatus. A continuous procedure which is clearly simplified in comparison with the prior art is made possible by using anhydrous substances.

The invention relates to an anhydrous process for the preparation of optionally branched polyarylene sulphides from a) 50-100 mol% of dihalogenoaromatics of the formula

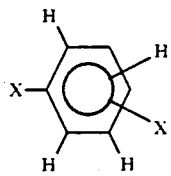

and 0-50 mol% of dihalogenoaromatics of the formula

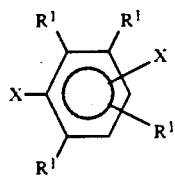

in which
the symbols X represent halogen, such as chlorine or bromine, in the meta or para-position relative to one another and
the symbols $R^1$ are identical or different and can be hydrogen, alkyl, cycloalkyl, aryl, alkylaryl or arylalkyl, it being possible for two radicals $R^1$ in the ortho-position relative to one another to be linked to form an aromatic or heterocyclic ring, and one radical $R^1$ always being other than hydrogen,
and b) 0 to 5 mol%, preferably 0 to 1.25 mol%, based on the sum of the dihalogenoaromatics of the formula I and II, of a tri- or tetrahalogenoaromatic of the formula $$ArX_n \qquad \qquad III$$

wherein
Ar is an aromatic or heterocyclic radical,
X represents halogen, such as chlorine or bromine, and
n represents the number 3 or 4,
and c) 50 to 100 mol% of sodium sulphide or potassium sulphide and 1 to 50 mol% of sodium bisulphide or potassium bisulphide, the molar ratio of (a+b):c being in the range from 0.75:1 to 1.15:1, preferably 0.90:1 to 1.10:1, in d) an organic solvent, also using catalysts and/or cosolvents, the molar ratio of sulphide and bisulphide c) to the organic solvent d) being in the range from 1:2 to 1:15, characterized in that the optionally continuous reaction is carried out such that the solvent, the halogenoaromatics of the formulae I, II and III and the bisulphides and/or sulphides with the catalysts and/or cosolvents in anhydrous form are added simultaneously or successively to the reaction mixture, the solids having a particle size of 1 to 5,000 micrometres, preferably 1 to 1,000 micrometres.

The reaction time can be varied within a wide range. It can be from less than one hour up to several days, preferably from 1 hour up to 48 hours and particularly preferably 2 to 18 hours.

Catalysts which can be employed are the substances customary for this purpose in the customary amounts, for example sodium fluorides, phosphates and carboxylates or potassium fluorides, phosphates and carboxylates. 0.02 to 1.0 mole of catalyst is employed per mole of sulphide.

Cosolvents which can be employed are, for example, N,N-dialkylcarboxylic acid amides of $C_1$-$C_8$-aliphatic and $C_6$-$C_{12}$-aromatic carboxylic acids in an amount of 0.02 to 1 mole per mole of sodium sulphide or potassium sulphide, for example N,N-dimethylacetamide, N,N-diethylacetamide or N,N-dimethylpropionamide.

According to the invention, meta- and para-dihalogenoaromatics of the formula (I) or (II) can be employed. In this case, the ratio of meta- to para-dihalogenoaromatic is up to 30:70.

p-Dihalogenoaromatics are particularly preferably employed to prepare polyarylene sulphides which can be processed particularly readily by thermoplastic methods.

The sulphides are employed in the customary amounts and in the customary manner. Sodium sulphide or potassium sulphide is suitable. Sulphides which are prepared from the bisulphides with sodium hydroxides or potassium hydroxides can be used.

Suitable bisulphides are sodium bisulphide or potassium bisulphide. They can be prepared from hydroxides and hydrogen sulphide. It is also possible to prepare them from sulphides with hydrogen sulphide.

Examples of the dihalogenoaromatics of the formula (I) to be employed according to the invention are: 1,4-dichlorobenzene, 1,4-dibromobenzene, 1-bromo-4-chlorobenzene, 1,3-dichlorobenzene, 1,3-dibromobenzene and 1-bromo-3-chlorobenzene. They can be used by themselves or as a mixture with one another. 1,4-Dichlorobenzene and/or 1,4-dibromobenzene are particularly preferred.

$R^1$ in formula II preferably represents hydrogen $C_1$-$C_{20}$-alkyl, $C_5$-$C_{20}$-cycloalkyl, $C_6$-$C_{24}$-aryl, $C_7$-$C_{24}$-alkylaryl or $C_7$-$C_{24}$-aralkyl. Furthermore, two radicals $R^1$ in the ortho-position relative to one another can form a fused-on aromatic ring with a total of 6 C atoms or a fused-on heterocyclic ring with 5-6 ring atoms and 1-3 hetero-atoms, such as N, O and S.

Examples of dihalogenoaromatics of the formula (II) to be employed according to the invention are: 2,5-dichlorotoluene, 2,5-dichloroxylene, 1,4-dichloro-2-ethylbenzene, 1,4-dibromo-2-ethylbenzene, 1-bromo-4-chloro-2-ethylbenzene, 1,4-dichloro-2,3,5,6-tetramethylbenzene, 1,4-dichloro-2-cyclohexylbenzene, 2,5-dichlorodiphenyl, -benzyl-1,4-dichlorobenzene, 2,5-dibromodiphenyl, 2,5- dichloro-4'-methyl-diphenyl, 2,5-dibromo-4'-methyldiphenyl, 1,4-dichloro-2-hexylbenzene, 2,4-dichlorotoluene, 2,4-dichloroxylene, 2,4-dibromocumene and 1,3-dichloro-5-cyclohexylbenzene. They can be employed by themselves or as a mixture with one another.

Ar in formula (III) preferably represents an aromatic radical with 6-24C atoms or heterocyclic radical with 6-24 ring atoms, particularly preferably an aromatic radical with 6-10 C atoms or heterocyclic radical which can contain up to 3 hetero-atoms, such as N, S or O.

Examples of tri- or tetrahalogenoaromatics of the formula (III) to be employed according to the invention are: 1,2,3-trichlorobenzene, 1,2,4-trichlorobenzene, 1,2,4-tribromobenzene, 1,3,5-trichloro-2,4,6-trimethylbenzene, 1,2,3-trichloronaphthalene, 1,2,6-trichloronaphthalene, 2,3,4-trichlorotouene, 2,3,6-trichlorotoluene, 1,2,3,4-tetrachlorobenzene, 2,2'-4,4'-tetrachlorodiphenyl and 1,3,5-trichlorotriazine.

Organic solvents which are suitable according to the invention are, for example, lactams, such as N-alkyllactams, for example N-methylpyrrolidone, N-ethylpyrrolidone N-methylpiperidone, N-isopropylpyrrolidone, N-methylcaprolactam and N-ethylcaprolactam.

The boiling point of the solvents should be 200° C. to 280° C.

The polyarylene sulphides according to the invention can be mixed with other polymers, pigments and fillers, for example graphite, metallic powders, glass powder, quartz flour, glass fibres and carbon fibres, or the customary stabilizers or mould release agents for polyarylene sulphides can be added.

In general, the melt flow properties of polyarylene sulphides is measured in accordance with ASTM 1238-70 bdi 316° C. using a 5 kg weight and is quoted in g/10 minutes.

If the melt flow values are high, however, this measurement can present difficulties because of the high discharge rate of the polymer melt.

The melt viscosity $\eta m$ of the polymer melt (in Pa.s) at 306° C. was thus determined as a function of the shearing stress (in Pa.s) with the aid of an Instron rotary viscometer.

The melt viscosity can be determined in a very wide range from $10^{-1}$ to $10^7$ Pa.s by this manner. In the Instron rheometer, the polymer is melted between a fixed plate and a rotatable cone and the torque of the cone is determined. Thus the torque, the angular velocity and the apparatus data, the melt viscosity can be calculated as a function of the shearing stress. The rheometer model 3250 from Instron was used; diameter of the cone and plate 2 cm.

The melt viscosity measured at a shearing stress of $\tau = 10^2$ Pa is quoted.

After isolation from the reaction mixture, the polyarylene sulphides according to the invention in general have melt viscosities of $0.1-10^1$ to $5-10^4$ Pa.s, preferably $0.1-10^2$ to $0.5-10^4$ Pa.s, and good colour properties.

Polyarylene sulphides can also be analysed by chromatographic processes, to provide information on their molecular weight and molecular weight distribution.

High-pressure liquid chromatography (HPLC) or gel permeation chromatography (GPC), for example, are particularly suitable for this.

The customary carrier materials, for example Li-Chroprep ®, Lohar ®, LiChrosorb ®, LiChrosphr ®, Perisorb ®, Fractogel ®, Fractosil ®, Ditrastyragel ®, Microstyragel ®, Zorbax ®, Bondage ®, and Shodex ®, can be used as the stationary phase.

All the customary solvents can be used as the solvent and mobile phase. These should dissolve the polymer sufficiently. Suitable examples are 1-chloronaphthalene, diphenyl, N-methylpyrrolidone, N-cyclohexylpyrrolidone, N-methylpiperidone, N-methylcaprolactam, N-methyllaurolactam, sulpholane, N,N'-dimethylimidazolidinone, N,N'-dimethylpiperazinone, hexamethylphosphoric acid triamide, 1-methyl-1-oxo-phospholane and mixtures thereof.

Absolute or relative calibrations can be carried out with the chromatographic analysis methods. Suitable calibrating substances for relative calibrations are, for example, the customary polymers, such as polystyrene, polyethylene, polyethylene terephthalate, polybutylene terephthalate, polyesters, such as purely aromatic polyesters, polycarbonate, polyamides, such as PA6 and PA11, polysulphones or polyether-sulphones.

The chromatography for analytical determination of the molecular weights or molecular weight distribution can be carried out under various pressures from 1 to 10 bar.

The chromatographic determination is carried out at a temperature of 20° to 250° C.

Substances such as alkali metal halides, alkaline earth metal carboxylates and phosphonium or ammonium compounds can furthermore be added to the sample to be analysed to improve the measurement accuracy.

The weight-average molecular weights $M_w$ can be stated in the evaluation of the analytical data thus determined. These are 25,000 to 500,000, preferably 25,000 to 300,000 and particularly preferably 25,000 to 150,000.

The polyarylene sulphides prepared according to the invention can be processed directly to films, shaped articles or fibres by extrusion, extrusion blow-moulding, injection moulding or otherwise customary processing techniques. These products can be used in the customary manner, for example as automobile components, fittings, electrical components, for example switches, electronic boards, components and apparatuses which are resistant to chemicals and stable to weathering, such as pump housings and pump impellers, etching bath dishes, sealing rings, components of office machines and communication equipment, and domestic appliances, valves and ball bearing components.

EXAMPLE 1

Use of an Apparatus with 2 Reaction Kettles 1,000 ml of N-methylcaprolactam and a homogeneous mixture of 2.0 mol of anhydrous sodium sulphide, 0.22 mol of sodium fluoride, 0.4 mol of anhydrous sodium bisulphide and 2.2 mol of 1,4-dichlorobenzene are initially introduced into a 4 l kettle equipped with a thermometer, stirrer, solids metering funnel, dropping funnel, reflux condenser and bottom outlet, and the mixture is warmed until it refluxes gently.

2.2 mol of 1,4-dichlorobenzene, dissolved in 1,000 ml of N-methylcaprolactam, and a homogeneous mixture of 2.0 mol of anhydrous sodium sulphide, 0.22 mol of sodium fluoride and 0.4 mol of anhydrous sodium bisulphide are then simultaneously metered in continuously in a total amount of 400 g/hour. As soon as the kettle is filled to an amount of in total 2,500 g, the reaction solution is discharged through the bottom outlet into the second reaction kettle at the rate at which the components are metered into the first kettle. The reaction mixture is likewise heated until it refluxes gently in the second kettle, which is equipped with a stirrer, reflux condenser, thermometer and bottom outlet. When this second kettle has also been filled to an amount of about 2,500 g, reaction solution is likewise removed continuously at the rate at which the solution is metered into the second kettle. The polyarylene sulphide is worked up by customary methods. White polyarylene sulphide is obtained in a yield of 94.6%, based on the 1,4-dichlorobenzene, and with a melt viscosity of 21 Pa.s.

EXAMPLE 2

The apparatus is analogous to Example 1.

The procedure is analogous to Example 1, but the mixture of sodium sulphide and bisulphide additionally contains 0.15 mol of sodium acetate per mol of sodium sulphide.

The throughput is furthermore increased to a total amount of 500 g/hour. A white polyarylene sulphide is obtained with a melt viscosity of 150 Pa.s and in a yield of 95.3%, based on the 1,4-dichlorobenzene.

EXAMPLE 3

Preparation of an anhydrous mixture of sodium sulphide and sodium bisulphide:

Sodium sulphide and sodium bisulphide are dissolved in a little water under the influence of heat, and the solution is added dropwise to a cold, inert solvent. The mixture thereby solidifies in the form of small homogeneous beads, which can be freed from water in vacuo at increasing temperatures, but always below the melting point of the mixture.

Preparation of an anhydrous homogeneous mixture of sodium sulphide, sodium bisulphide and sodium acetate:

Sodium sulphide, sodium bisulphide and sodium acetate are dissolved in as little water as possible at 130° C. and the solution is dried completely in a spray drier.

We claim:

1. Process for the anhydrous preparation of unbranched or branched polyarylene sulphides which comprises reacting a reaction mixture which contains a) 50–100 mol% of dihalogenoaromatics of the formula I

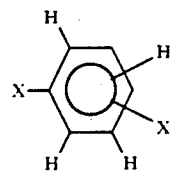

and 0–50 mol% of dihalogenoaromatics of the formula II

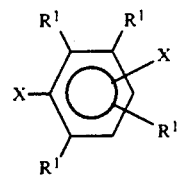

in which the symbols X represent halogen in the meta or para-position relative to one another and the symbols $R^1$ are identical or different and each is hydrogen, alkyl, cycloalkyl, aryl, alkylaryl, or arylalkyl, or in the alternative wherein two radicals $R^1$ are in the ortho-position relative to one another, both together comprise an aromatic or heterocyclic ring, with the promise that at least one radical $R^1$ is other than hydrogen, b) 0 to 5 mol% based on the sum of the dihalogenoaromatics of the formula I and II, of a tri- or tetrahalogenoaromatic of the formula III

 $ArX_n$     III wherein

Ar is an aromatic or heterocyclic radical,

X represents halogen, and n represents the number 3 or 4, and c) 50 to 100 mol% of sodium sulphide or potassium sulphide and 1 to 50 mol% of sodium bisulphide or potassium bisulphide, the molar ratio of (a+b):c being in the range from 0.75:1 to 1.15:1, in d) an organic solvent wherein the molar ratio of sulphide and bisulphide c) to the organic solvent d) being in the range from 1:2 to 1:15, characterized in that the reaction is carried out such that the solvent, the halogenoaromatics of the formulae I, II and III and the bisulphides and sulphides in anhydrous form are added simultaneously or successively to the reaction mixture and wherein any solids of the reaction mixture have a particle size of 1 to 5,000 micrometers.

2. Process according to claim 1, characterized in that the reaction temperature is 200° to 270° C.

3. Process according to claim 1, characterized in that N-methylcaprolactam is used as the solvent.

4. Process according to claim 1, characterized in that sodium carboxylates or potassium carboxylates are employed as catalysts.

5. Process according to claim 1, characterized in that 1,4-dichlorobenzene is employed as the dihalogenoaromatic.

6. Process according to claim 1, characterized in that the solids have a particle size of 1 to 1,000 micrometers.

7. Process according to claim 1 wherein the reaction is carried out in one reaction kettle or continuously in a cascade of from two to six reaction kettles.

8. Process according to claim 7 wherein the reaction is carried out in a cascade of from two to six reaction kettles with the reaction mixture being metered from one kettle to the next in the cascade whereby the reaction is conducted continuously and wherein the reaction temperature increases from kettle to kettle and differs by from 5° to 30° C.

* * * * *